Patented Feb. 7, 1939

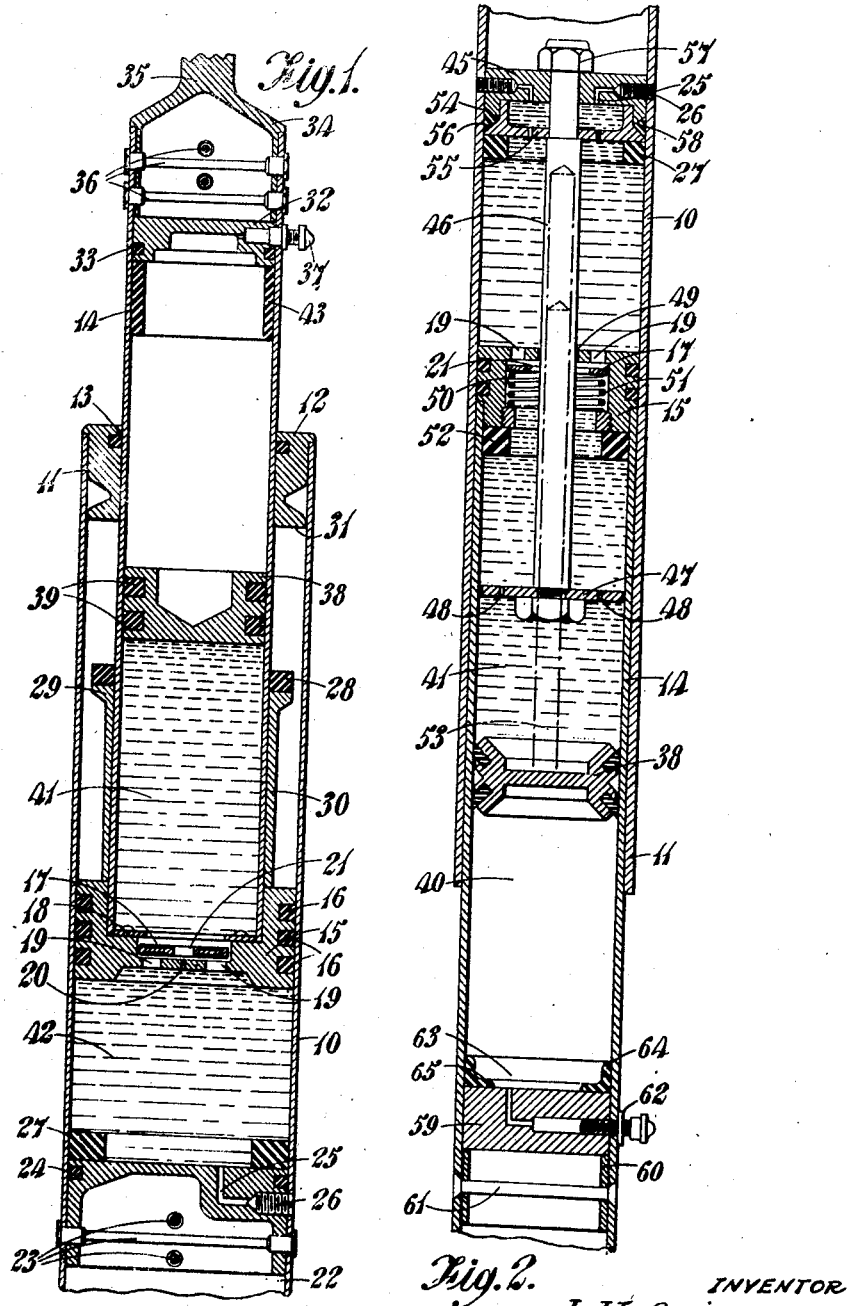

2,146,089

UNITED STATES PATENT OFFICE 2,146,089

SHOCK ABSORBENT STRUT FOR AIRCRAFT

John Henry Onions, Leamington Spa, England

Application August 15, 1936, Serial No. 96,270
In Great Britain August 15, 1935

8 Claims. (Cl. 267—64)

This invention relates to resilient struts, particularly for aircraft, of the kind in which a plunger tube is slidably mounted within a cylinder tube, each being closed at a position remote from its inner end to provide an internal space of variable volume containing a liquid, such as oil, and gas under pressure, such as air, the liquid during relative reciprocation of the tubes in one or both directions being caused to pass through one or more restricted openings for damping this movement of the tubes, while the compressed gas provides the whole of the resilience normally required, the strut of course, being capable of carrying a substained normal load without becoming completely closed.

It is the object of the present invention to provide an improved construction of strut which is capable of proper operation irrespective of its position with regard to the vertical, said strut accordingly being satisfactory for use with various designs of undercarriage or like structures, and even in cases where complete or partial inversion has to be allowed for as in some designs of retractable undercarriage and in machines adapted for inverted flying.

The invention further seeks to provide an improved form of strut construction which is extremely rigid by comparison with its weight and aerodynamic drag, the general design of said strut being such that the rate of compression and other characteristics can readily be modified during the assembly of the parts without changing the dimensions of the latter or of the strut unit as a whole.

The invention accordingly provides a strut of the kind referred to in which there is provided a floating piston which is free in relation to the plunger and cylinder tubes, and which is arranged to constitute the boundary between the liquid and the compressed gas. If desired, a fixed piston which is anchored relatively to the cylinder tube may also be provided within the plunger tube for the purpose of enabling a positive damping effect to be obtained during the expansion or rebound movement of the strut.

Moreover, in a resilient strut of the kind referred to comprising a unit, the whole length of which is constituted by two continuous lengths of tube serving as plunger and cylinder respectively, according to a further feature of the invention the internal space containing the compressed gas is bounded by a plug member formed separately from the corresponding tube and of greater axial thickness than the thickness of the wall of said tube, which plug member is disposed intermediate the ends of the tube to which it is attached and which it serves to close in a fluid tight manner. Thus the internal space containing the liquid and compressed gas may be bounded at its two ends by plug members, each of which is formed separately from the tubes and is disposed intermediate the ends of that tube to which it is attached, the arrangement being such that the two tubes together constitute the whole length of the strut as governed by the general design and size of the undercarriage or equivalent, while a portion only of the total length can readily be utilized for the liquid and compressed gas space. This enables the improved struts to be constructed from comparatively light tubing, and as the whole cross-sectional area of the space within the tubes is utilized in an efficient manner, the diameter, and more especially the weight for a given loading, can be made very much less than is possible with struts known hitherto. The internal space containing the liquid and compressed gas may conveniently be bounded at one end at least by a fixed plug member fitted within one of the tubes intermediate its ends and provided with a peripheral packing composed of soft material, such as rubber, said packing if desired being in the form of an annular cup washer packing of L-shape in radial section.

For the purpose of supporting the freely mounted piston serving as the boundary between the liquid and the gas under pressure, an axial stem may be provided by which said piston is maintained in alignment with the axis of the plunger tube.

The invention is illustrated in the accompanying diagrammatic drawing in which:—

Figure 1 is a longitudinal sectional elevation through one form of strut; and

Figure 2 is a similar view showing a modified construction.

It will be understood that, in order to make the general operation clear, the diameters of the various parts shown in the drawing have been somewhat exaggerated and that as designed for present day aircraft the thickness of the tubes and their diameters can generally be advantageously reduced by comparison with the stroke and overlap of the plunger tube within the cylinder tube.

Referring firstly to Figure 1, the cylinder tube is indicated at 10, and is provided at what is herein termed its "inner end" 11 with a bush 12 composed of anti-friction material accommodating a soft annular packing 13 for preventing the ingress of dust and other foreign material.

Slidably mounted within the bush 12 is a plunger tube 14 carrying at its "inner end" a substantially cylindrical body 15 serving as a plunger head. The latter is provided upon its periphery with any suitable form of leak-preventing packing indicated at 16, and is hollowed out at its centre part for the accommodation of an annular plate 17 serving as a so-called "flutter valve" for producing controlled liquid damping, said plate 17 conveniently being maintained in position by the inwardly overhanging edge of a retaining ring 18. The lower wall of the plunger head 15 is provided with a circular series of comparatively large apertures 19, which are adapted to be covered by the plate 17 and with a small central opening 20 disposed in register with a larger central opening 21 in the plate 17. It will thus be seen that when the fluid pressure below the piston head is greater than that above, as seen in Figure 1, the fluid will flow through the holes 19 and lifting the plate 17 will pass relatively freely through the central aperture 21. On the other hand when the pressure within the plunger tube 14 is the greater the plate 17 will be held firmly downwards, and the fluid can then only pass through the restricted orifice 20, since the holes 19 are closed.

At a position below the plunger head 15 (as seen in Figure 1) the cylinder tube 10 is closed by a plug member 22 which may conveniently be disposed intermediate the two ends of the tube 10 so that the strength and rigidity of this portion of the strut is maintained. This plug member 22 is held in position by means of say three diametral pins, rivets, bolts or equivalent 23, while a fluid tight joint is obtained by the use of a packing ring indicated at 24. The plug member 22 is provided with a passage 25 through which oil is forced into the interior of the cylinder, a screw-threaded closure plug 26 conveniently being provided. An annular buffer 27, composed for example of rubber, rests upon the plug member 22 and serves as a resilient stop for arresting inward movement of the plunger tube 14, while a similar ring 28 surrounding the plunger tube 14 and supported by a shoulder 29 upon a spacing tube 30 engages with the inner part 31 of the bush 12 when the limit of outward movement of the plunger tube 14 is reached.

Adjacent the outer end of the plunger tube 14 another plug member is provided, and is indicated at 32, said plug member being provided with a packing ring 33 and being restrained against outward movement by a bell-shaped fitment 34 which is provided with a lug 35 serving for the external attachment of the plunger tube 14 to the aircraft fuselage or equivalent, transverse pins or bolts 36 being provided for holding the fitment 34 in position. The plug member 32 is moreover fitted with an air inlet valve 37 through which compressed air is passed so as to build up the requisite resilience.

Disposed within the plunger tube 14 is a freely mounted piston 38 which can conveniently be of cup shape as shown, and is provided with packing rings 39, said freely mounted piston 38 serving as the boundary between compressed air or other gas in the space 40 and oil or other liquid in the space 41 within the plunger tube 14 and space 42 within the cylinder tube 10.

When in flight, the strut is fully extended. If a leak of oil should occur, the air pressure would force the floating piston against the plunger head thus relieving the liquid in the cylinder from all further pressure, and allowing there to be maintained within the cylinder sufficient liquid to ensure a safe landing.

It will, of course, be appreciated that the total space 40, 41 and 42 varies in volume according to the relative positions of the tubes 10 and 14 and that this space is bounded by the two plug members 22 and 32. A sleeve 43 is fitted within the upper part of the space 40 and is utilized as a stop for the floating piston 38, said sleeve conveniently being of somewhat soft material, such as rubber. It will be appreciated also that at the lower end (not shown) of the cylinder tube 10 a convenient fitment is provided whereby said tube can be attached to the axle or other equivalent part of an undercarriage, so that in the example shown in Figure 1 the main part of the length of the strut is constituted by the cylinder tube 10.

The procedure of preparing the strut for use after installation is very simple, and consists in opening the air valve 37 then fully compressing the strut until the plunger head 15 rests upon the buffer 27 and pumping in oil through the passage 25 until the piston 38 reaches the lower end of the sleeve 43. The plug 26 is then replaced and air is pumped in through the valve fitting 37 until the requisite pressure in the space 40 is attained. This air pressure serves to provide the whole of the resilience of the strut whereas the desired damping effect for reducing oscillation is obtained in the known manner by the action of the flutter valve 17.

A somewhat similar general arrangement but of different construction is shown in Figure 2 in which the relative disposition of the parts is reversed, the cylinder tube 10 containing the oil in this case constituting what is normally the upper part of the strut. Mounted within the inner or lower end 11 of the tube 10 is the plunger tube 14 carrying at its upper end a plunger head 15 arranged as in the previous example, except that it is inverted.

The upper plug member, indicated at 45, in this case supports a coaxial rod or tube 46 carrying at its outer end a circular plate 47 serving as a fixed piston i. e. a piston which is fixed relative to the cylinder tube 10, said piston 47 being provided with a number of small apertures 48 and, if desired, a comparatively large working clearance between its periphery and the interior of the tube 14 so as to allow fluid to pass from one side to the other of said fixed piston 47. An aperture 49 formed in the centre of the plunger head 15 also has a prescribed working clearance with regard to the exterior of the rod or tube 46, and this serves to provide the constricted passage through which the liquid has to flow for producing the necessary damping action. The plunger head 15 is also provided with comparatively large apertures 19 as before, while the flutter plate 17, which is formed with a large central hole 21, is slidably mounted within a cavity 50, but normally closes the apertures 19 under the action of a coiled compression spring 51. A resilient stop ring 27 is provided as previously within the cylinder tube 10 and is engaged by the plunger head 15 when the strut is compressed to the maximum extent, but the rebound movement is limited in this embodiment by the provision of an annular cushion 52 provided within the plunger tube 14 and arranged to engage with the fixed piston 47. A floating or free piston 38 is again provided within the plunger tube 14, and is arranged to separate the oil within the space 41 from the compressed air in the space 40, said free piston, if desired, being provided with an axial stem which is indicated at 53, and is slidably mounted within a bore in the member 46, thus maintaining the free piston in a truly radial plane without the necessity of unduly increasing its length and weight.

The arrangement shown in Figure 2 having the fixed piston 47 is mainly advantageous on account of the fact that, during both expanding and contracting movement of the strut, a positive liquid pressure is present for forcing the liquid past the flutter valve, the extent of this positive pressure depending upon the force exerted axially upon the strut, and in no circumstances is it possible for a vacuum or "suction" effect to be produced under the action of an excessively violent extension movement of the two tubes 10 and 14. It will be appreciated moreover that the fixed piston 47 has a steadying effect upon the movement of the free piston 38, as the volume of liquid between these two pistons only varies to a slight extent on account of the difference between the cross-sectional area of the cylinder tube 10 and the cross-section area of the plunger tube 14.

The plug member 45 comprises an outer portion having a chamfered edge 54 and an inner portion 55 having also a chamfered edge 56, these two parts being clamped axially by means of a nut 57 upon the rod or tube 46 so that a ring 58 of soft packing material, such as rubber, is thereby forced outwardly into firm contact with the interior of the cylinder tube 10. Suitable anchorage screws or equivalent (not shown) are of course provided for preventing endwise displacement of the plug member 45 and an oil-filling plug 26 closing an inlet passage 25 is fitted as in the previous example.

The lower plug member, indicated at 59, comprises a substantially cylindrical block of metal which fits within the plunger tube 14, and is prevented from endwise displacement by means of a tube 60 which is secured by one or more diametral pins 61. Alternatively the tube 60 may be extended to bear against the usual end fitting (not shown) of the strut to resist the end thrust on the plug 59. The plug member 59 is fitted with a valve 62 through which air under pressure can be passed into the space 40, an efficient seal between said member 59 and the interior of the plunger tube 14 being obtained by a cup washer packing 63 which is conveniently formed from rubber, and is of L-shape in radial section. The two lips 64 and 65 are forced by the air pressure into firm engagement with the interior of the tube 14 and the upper surface of the plug member 59 respectively, and a reliable seal is thus obtained.

The invention thus provides an extremely simple construction of resilient strut which is particularly suited to the needs of aircraft, as it is very light in weight and small in diameter by comparison with its permissible loading. This to a large extent is due to the fact that ordinary drawn tubing of steel or light alloy can readily be used in its manufacture, and that the great strength of this tubing is utilized to the best advantage to resist bending moments as the only essential joint which is positioned intermediate the ends of the strut is the sliding joint between the cylinder tube and the plunger tube. This joint, of course, can easily be made sufficiently rigid by arranging that the tubes shall overlap to an adequate amount when the strut is fully extended. Further, the use of the free piston enables the compressed gas to be confined to the plunger tube, thus reducing leakage to a minimum, and moreover it permits the sliding packing of the plunger head to be permanently immersed in oil or other working liquid irrespective of the attitude in which the strut is placed thus avoiding sliding air seals. This not only tends further to reduce leakage but also maintains the sliding surfaces of the plunger tube and cylinder tube in a well lubricated condition. Finally, the improved strut can be very satisfactorily employed in retractable undercarriages of all forms, and is of particular utility in those cases where the strut becomes inverted during the action of folding the undercarriage.

What I claim is:—

1. A resilient oleo-pneumatic strut comprising a cylinder tube, a plunger tube, said tubes being closed at a part remote from their inner ends, said tubes being slidably engaged and defining a working space of variable volume, a piston head on the inner end of the plunger tube, a floating partition piston dividing the space within the plunger into compartments, one of said compartments for the accommodation of compressed air and the other of said compartments for the accommodation of oil, said plunger head having a construction formed therein to limit the passage of oil between the plunger and the cylinder, a fixed piston disposed within the oil-filled space between the floating partition piston and the piston head and providing a damping effect, and a stem secured to the cylinder and extending through the piston head for supporting the fixed piston.

2. A resilient oleo-pneumatic strut as claimed in claim 1 having at the back of the piston head an annular buffer which is engaged by the fixed piston as the strut extends, thereby resiliently limiting the extension movement of said strut.

3. A resilient oleo-pneumatic strut comprising a cylinder tube and a plunger tube each closed at a part remote from its inner end, said tubes being slidably engaged to define a working space of variable volume, a piston head on the inner end of the plunger tube, a floating partition piston dividing the space within the plunger into two compartments, one of said compartments being for the accommodation of compressed air and the other of said compartments being for the reception of oil, said plunger head having a constriction movement to limit the passage of oil between the plunger and the cylinder during movement of the tubes, a fixed piston comprising a circular plate perforated with a plurality of constricted openings, said fixed piston being disposed within the oil filled space between the floating partition piston and the piston head and providing a damping effect during relative movement between the cylinder tube and plunger tube, and a stem secured to the cylinder and extending through the piston head for supporting the fixed piston.

4. A resilient oleo-pneumatic strut comprising a cylinder tube and a plunger tube each closed at a part remote from its inner end, said tubes being slidably engaged and defining a working space of variable volume, a piston head on the inner end of the plunger tube, a floating piston dividing the space within the plunger into two compartments, one of said compartments for the accommodation of compressed air and the other of said compartments for oil, a central aperture formed in the plunger head, an axial stem carried by the cylinder tube and extending through the piston head into the plunger tube and defining a clearance between said axial stem and said piston head, said clearance constituting a constriction through which the oil is caused to pass, and a fixed piston comprising a circular plate carried by said stem and disposed within the oil filled space between the floating piston and the piston head.

5. A resilient oleo-pneumatic strut comprising a cylinder tube and a plunger tube each closed at a part remote from its inner end, said tubes being slidably engaged to define a working space of variable volume, a piston head on the inner end of the plunger tube, a floating partition piston dividing the space within the plunger tube into two compartments, one of said compartments for compressed air and the other of said compartments for oil, a resilient sleeve within the plunger tube to limit the movement of the floating piston toward the outer end of the compressed air compartment, a fixed piston disposed within the oil filled space between the floating partition piston and the piston head and serving as a damper for movement between the tubes, and a stem secured to the cylinder and extending through the piston head for supporting the fixed piston.

6. A resilient oleo-pneumatic strut comprising a cylinder tube and a plunger tube, a removable plug member in each tube at a position remote from its inner end, said tubes being slidably engaged to define a working space of variable volume, a piston head on the inner end of the plunger tube, a floating partition piston dividing the space within the plunger into two isolated compartments, one for compressed air and the other for oil, a fixed piston disposed within the oil filled compartment between the piston head and the floating piston, and a stem secured to the cylinder and extending through the piston head for supporting the fixed piston.

7. A resilient oleo-pneumatic strut as claimed in claim 6, wherein the removable plug member in the cylinder tube comprises a pair of elements, means whereby the elements are clamped together axially, and a rubber ring which is thereby compressed outwardly into fluid-tight contact with the tube.

8. A resilient oleo-pneumatic strut comprising a cylinder tube, a plunger tube slidably mounted therein, a piston head at the inner end of the plunger tube, a removable closure plug at the other end of said tube, a removable plug closing the outer end of the cylinder tube, an axial stem carried by the cylinder closing plug and extending through an aperture in the piston head, a perforated plate serving as a fixed piston carried upon the end of the stem within the plunger tube, a floating partition piston disposed within the plunger tube between the fixed piston and the closure plug for the plunger tube, and a flutter valve plate carried by the piston head and adapted to close a series of main openings through the piston head during the extension movement of the strut thereby constraining the liquid damping medium to pass through the constricted clearance passage between the stem of the fixed piston and the hole in the piston head through which said stem passes.

JOHN HENRY ONIONS.